(12) United States Patent
Bentley et al.

(10) Patent No.: US 10,878,849 B2
(45) Date of Patent: *Dec. 29, 2020

(54) METHOD AND APPARATUS FOR CREATING SHORT VIDEO CLIPS OF IMPORTANT EVENTS

(71) Applicant: Google Technology Holdings LLC, Mountain View, CA (US)

(72) Inventors: Frank R. Bentley, Palantine, IL (US); Rohit S. Bodas, Vernon Hills, IL (US); Michael E. Groble, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/579,659

(22) Filed: Sep. 23, 2019

(65) Prior Publication Data
US 2020/0020358 A1 Jan. 16, 2020

Related U.S. Application Data

(63) Continuation of application No. 15/481,337, filed on Apr. 6, 2017, now Pat. No. 10,424,338, which is a
(Continued)

(51) Int. Cl.
*G11B 27/031* (2006.01)
*G06F 3/0482* (2013.01)
(Continued)

(52) U.S. Cl.
CPC .......... *G11B 27/031* (2013.01); *G06F 3/0482* (2013.01); *G06F 3/04847* (2013.01); *G11B 27/034* (2013.01); *G11B 27/34* (2013.01)

(58) Field of Classification Search
CPC . G06F 3/04847; G06F 3/0482; G11B 27/031; G11B 27/34; G11B 27/034
See application file for complete search history.

(56) References Cited

U.S. PATENT DOCUMENTS

| | | | |
|---|---|---|---|
| 5,388,197 A | 2/1995 | Rayner | |
| 6,031,529 A | 2/2000 | Migos et al. | |

(Continued)

OTHER PUBLICATIONS

Ozer, J. "Pinnacle Studio 11 for Windows: Visual QuickStart Guide," Peachpit Press, Nov. 6, 2007, 164 pages.
(Continued)

*Primary Examiner* — Amy M Levy
(74) *Attorney, Agent, or Firm* — Lowenstein Sandler LLP

(57) ABSTRACT

A method and apparatus for creating video clips is provided herein. A method includes displaying, by a client device, one or more video streams, displaying, by the client device, a plurality of soft buttons, each of the plurality of soft buttons associated with a different length of time, receiving, by the client device, a selection of a soft button from the plurality of soft buttons, and displaying, by the client device, a presentation area including one or more segments of the one or more video streams, the one or more segments of the length of time associated with the selected soft button and captured from the one or more video streams, wherein the presentation area has an x-axis representing time. The method further includes receiving, by the client device, selection information indicating for each of the one or more segments a starting point and an ending point selected by a user from the presentation area, and displaying, by the client device, an indication of the creation of a video clip from the one or more segments based on the selection information.

20 Claims, 4 Drawing Sheets

Related U.S. Application Data continuation of application No. 12/256,578, filed on Oct. 23, 2008, now Pat. No. 9,646,648.

(51) Int. Cl.
*G11B 27/34* (2006.01)
*G11B 27/034* (2006.01)
*G06F 3/0484* (2013.01)

(56) References Cited

U.S. PATENT DOCUMENTS

| | | | |
|---|---|---|---|
| 6,353,461 | B1 | 3/2002 | Shore et al. |
| 6,618,058 | B1 | 9/2003 | Yasui |
| 6,873,344 | B2 | 3/2005 | Samra et al. |
| 7,024,677 | B1 | 4/2006 | Snyder et al. |
| 7,203,693 | B2 | 4/2007 | Carlbom et al. |
| 7,375,768 | B2 | 5/2008 | Herberger et al. |
| 7,428,314 | B2 | 9/2008 | Henson |
| 7,823,056 | B1 | 10/2010 | Davey et al. |
| 2003/0007663 | A1 | 1/2003 | Wixson et al. |
| 2003/0009773 | A1 | 1/2003 | Carlson |
| 2003/0052906 | A1 | 3/2003 | Lau et al. |
| 2003/0210329 | A1 | 11/2003 | Aagaard et al. |
| 2004/0001079 | A1 | 1/2004 | Zhao et al. |
| 2004/0169683 | A1 | 9/2004 | Chiu et al. |
| 2004/0263529 | A1 | 12/2004 | Okada et al. |
| 2005/0033758 | A1 | 2/2005 | Baxter |
| 2007/0182864 | A1 | 8/2007 | Stoneham et al. |
| 2008/0143875 | A1 | 6/2008 | Scott et al. |
| 2009/0010485 | A1 | 1/2009 | Lamb et al. |

OTHER PUBLICATIONS

United States Advisory Action, U.S. Appl. No. 12/256,578, dated Feb. 12, 2015, three pages.

United States Decision on Appeal, U.S. Appl. No. 12/256,578, Dec. 19, 2016, six pages.

United States Examiner's Answer to Appeal Brief, U.S. Appl. No. 12/256,578, Aug. 21, 2015, 16 pages.

United States Office Action, U.S. Appl. No. 12/256,578, dated Apr. 1, 2014, 16 pages.

United States Office Action, U.S. Appl. No. 12/256,578, dated Jun. 27, 2013, 14 pages.

United States Office Action, U.S. Appl. No. 12/256,578, dated Apr. 23, 2012, 10 pages.

United States Office Action, U.S. Appl. No. 12/256,578, dated Oct. 26, 2011, 12 pages.

United States Office Action, U.S. Appl. No. 12/256,578, dated Jul. 6, 2011, 19 pages.

100

METHOD AND APPARATUS FOR CREATING SHORT VIDEO CLIPS OF IMPORTANT EVENTS

CROSS-REFERENCE TO RELATED APPLICATION

This application is a continuation of U.S. patent application Ser. No. 15/481,337, filed Apr. 6, 2017, now U.S. Patent No. 10,424,338 which is a continuation of U.S. patent application Ser. No. 12/256,578, filed Oct. 23, 2008, now U.S. Pat. No. 9,646,648, each of which is incorporated by reference herein in its entirety.

FIELD OF THE INVENTION

The present invention relates generally to creating video clips, and in particular, to a method and apparatus for creating video clips of important events.

BACKGROUND OF THE INVENTION

In providing video content to fans of live events, it is necessary to create short video clips of important events in the game/event (e.g., a goal in a soccer game taken from multiple angles). These short video clips are then made available to fans via posting to a web site, or transferring them directly to a mobile device. A continuous video stream is too cumbersome for end users to navigate and results in a large amount of data being sent over a network.

Currently it is quite difficult to create these sorts of multi-stream clips. Typically, multiple operators are needed, one assigned to editing and clipping each feed (video source) to create the desired clips quickly, or one user has to go through each feed serially resulting in a long delay before the clips are available. Besides the editing, clips then need to be annotated which can be a time-consuming process. Therefore a need exists for a method and apparatus for creating video clips of important events that simplifies the creation of these clips.

Figure 1:
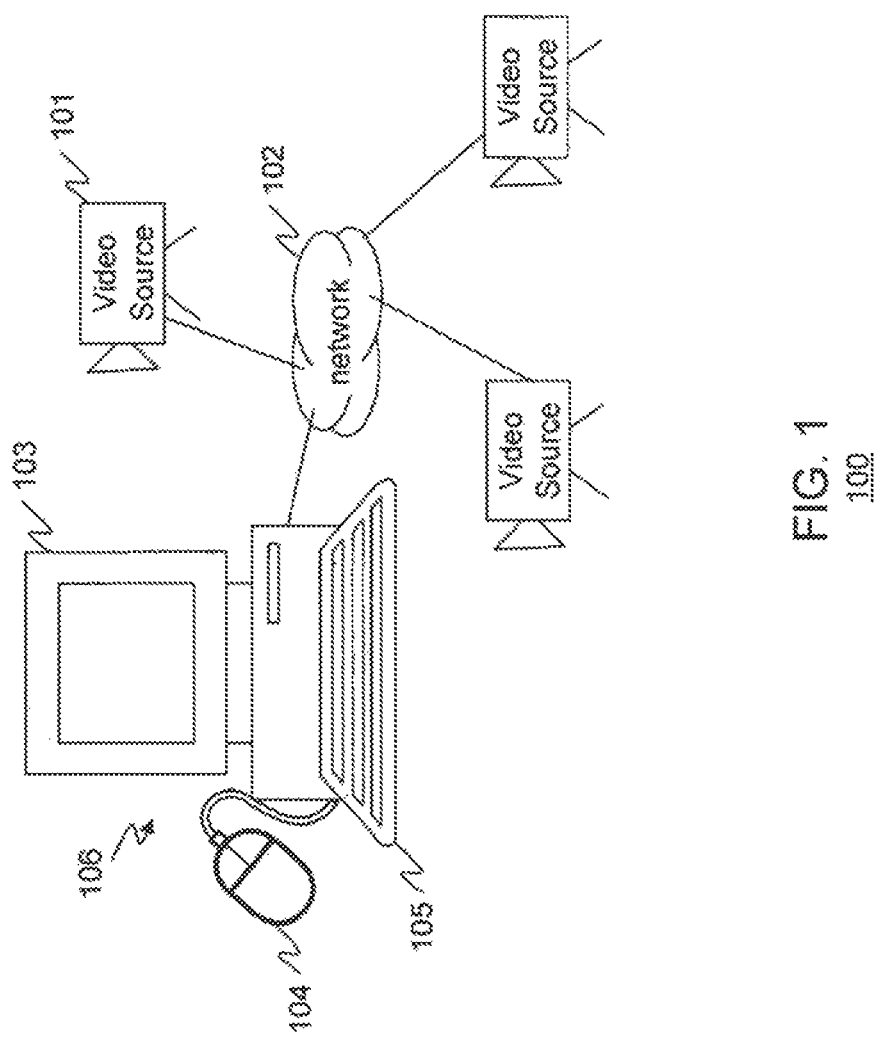
FIG. 1 is a block diagram of a system that can create video clips.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In order to alleviate the above-mentioned need, a method and apparatus for creating video clips is provided herein. During operation, a processing device will receive multiple video feeds from multiple video sources. In order to reduce the difficulty in producing multiple clips from the multiple video sources, a screen of the captured content is displayed and one-click selection of start and stop points of each clip is allowed. An operator can then pick an annotation (metadata) from events in the game or enter a new one and apply it to any or all of the video clips. Suggested content is then displayed based on the metadata of this annotation and can be bundled with the video clips by choosing from the list of related content. All of this content is then bundled together in a database.

The above-described capture of video allows operators to quickly and easily create video clips at a live event and make those clips available to end users in seconds. Easy annotation of the resulting clips is also provided in one step as well as providing related media for all of the captured content as a cohesive block.

The present invention encompasses a method comprising the steps of providing multiple videos to a user, receiving a command to create video clips of a particular length of time from the multiple videos, and capturing segments of the multiple videos for the particular length of time. Multiple images of the captured segments are then displayed as an array, where the array has an x-axis representing time, and a y-axis representing video source, or vice versa. Finally video clips are created from the captured segments.

The present invention additionally encompasses a method comprising receiving video from multiple video cameras, providing the video to a user as a thumbnail for each of the multiple cameras, receiving a command to create video clips of a particular length of time from the multiple video cameras, and capturing segments from the multiple video cameras for the particular length of time. Multiple thumbnails of the captured segments are then displayed as an array, where the array has an x-axis representing time, and a y-axis representing video source, or vice versa, Finally video clips from the captured segments are created.

The present invention additionally encompasses an apparatus comprising a display providing multiple videos to a user, an input device receiving a command to create video clips of a particular length of time from the multiple videos, and a processor capturing segments of the multiple videos for the particular length of time and instructing the display to display multiple images of the captured segments as an array. The array has an x-axis representing time, and a y-axis representing video source, or vice versa.

Turning now to the drawings, where like numerals designate like components, FIG. 1 is a block diagram showing system 100 that can capture video clips from multiple video sources. The system of FIG. 1 includes multiple video sources 101 (only one labeled), network 102, and computer system 106. Video sources 101 preferably comprise video cameras providing a live event feed through network 102 to computer 106, however, in alternate embodiments of the present invention video sources 101 may comprise other devices capable of providing video to computer 106. For example, video sources 101 may comprise databases that provide stored video content to computer 106. In yet another embodiment, multiple video sources (e.g. cameras) can be connected to one or multiple video encoders (not shown) which are then connected directly to the computer 106 or to the network 102.

Network 102 may comprise any type of network capable of transferring data between video sources 101 and computer 106. If video sources 101 and computer 106 are in close proximity, network 102 may comprise a simple coax cable connection between video sources 101 and computer 106. However, if video sources 101 and computer 106 are separated by a large distance, network 102 may comprise any wired or wireless network capable of transmitting data. Such networks include, but are not limited to, an IP-based network, a wireless local-area network (WLAN) (e.g., IEEE 802.11a/g), a Bluetooth, IEEE 802.11, or HyperLAN network, an IEEE 802.15.3 or a IEEE 802.15.4 ad-hoc network, . . . , etc.

Computer system 106 preferably comprises a standard computer system capable of using any operating system, such as Microsoft Windows, UNIX, . . . , etc. As shown, computer system 106 comprises display device 103, such as a computer monitor, and input devices 104 and 105. In one embodiment of the present invention, input devices 104 and 105 comprise a standard computer mouse and keyboard; however, in alternate embodiments of the present invention other input devices may be used to obtain user feedback such as direct touch of thumbnails and buttons.

During operation of system 100 video sources 101 provide video of, for example, a sporting event to computer system 106. Display device 103 will display a thumbnail (i.e., a small image) of each devices video in real-time. So, for example, if video sources are currently capturing a live sporting event, display 103 displays live action in the game for each camera 101 as a thumbnail. These video previews may also be shown on an external monitor.

As described above, in providing video content to fans of live events, it is necessary to create short video clips of important events (e.g., a goal in a soccer game taken from multiple angles). These short video clips are then made available to fans via posting to a web site, or transferring them directly to a mobile device. With prior-art systems it is quite difficult to create these sorts of multi-stream clips.

In order to address this issue, a user of computer system 106 will be provided with an option of capturing a predetermined time period from each camera. In one embodiment of the present invention, the option of capturing the predetermined time period is given to the user as a series of soft buttons, each allowing the user to capture a different amount of time. Thus, when an operator identifies a moment in an event to capture into video clips, the operator can choose to grab the last m seconds of the event by pressing a designated start and/or end button in real time. In alternate embodiments, the user could manually choose to start and end recording of all clips or could choose a time period extending into the past and future (e.g. a 30 second clip, starting 20 seconds ago). When a user has initiated a capture of an event, an array of thumbnails covering the extent of the clips is created, with an x-axis representing time, and a y-axis representing a camera, or vice versa. This is illustrated in FIG. 2.

Figure 2:
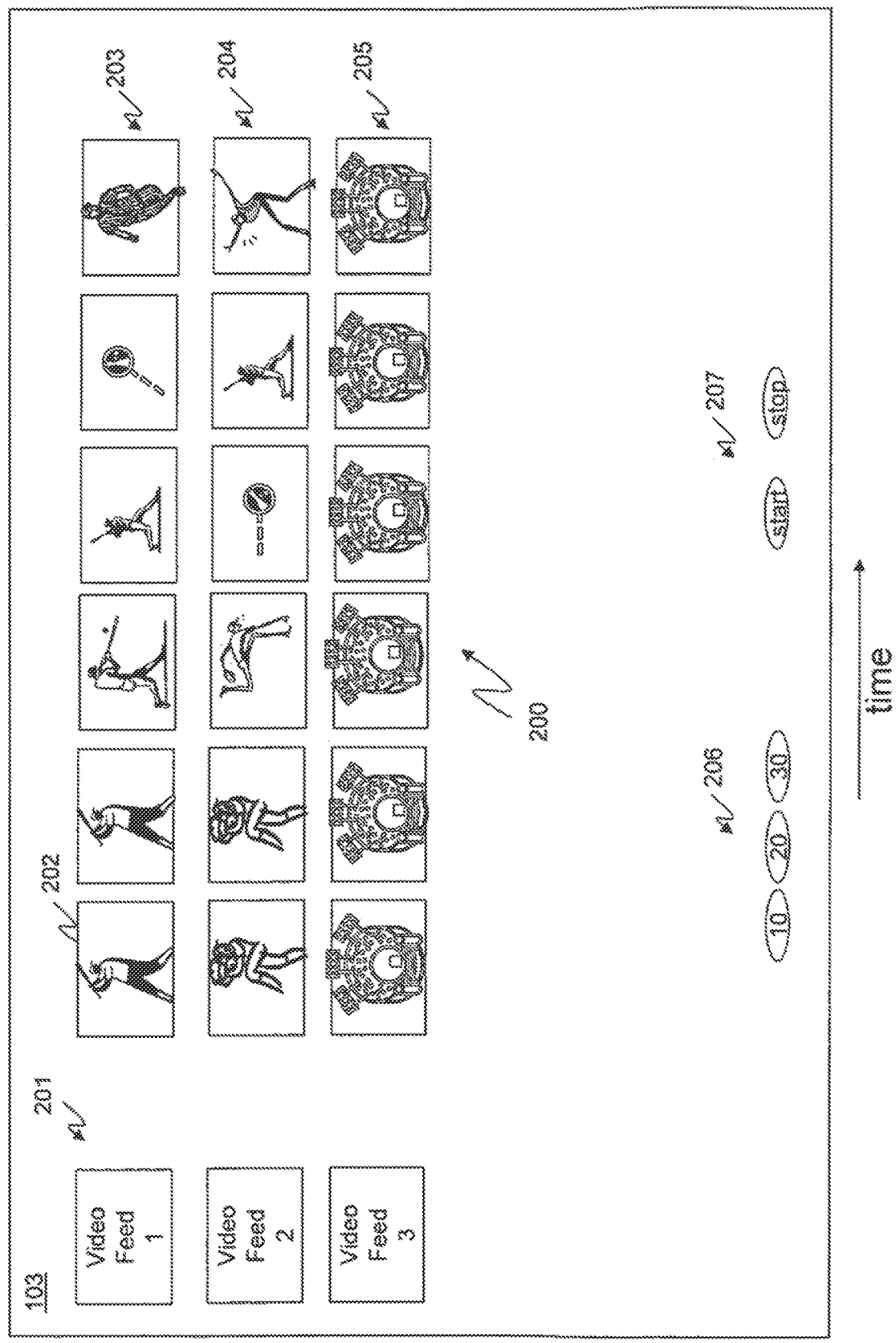
FIG. 2 illustrates a display of multiple video sources.

As shown in FIG. 2, display device 103 displays soft buttons 206 for capturing a predetermined amount (e.g., 10, 20, or 30 seconds) of video. Other buttons 207 are provided for capturing a varying amount of video from each camera. Display device 103 also displays a video feed 201 (preferably a live video feed) for multiple video sources. For simplicity, only three video sources are shown in FIG. 2.

When a user wishes to capture multiple clips from multiple video sources of an event, the user depresses the desired soft key 206/207 to initiate capture of the clips. In response, an array 200 is displayed. Array 200 comprises thumbnail images 202 (only one labeled) of video from the clip and provides intermediate images from the clipping window for each video stream 203, 204, and 205. Thus, as shown in FIG. 2, rows 203, 204, and 205 of the array comprise images from the clip, with each row representing a differing video source. In an alternate embodiment of the present invention, each column may represent a video source. In the embodiment where the start/stop buttons are utilized, this thumbnail array may be generated dynamically and displayed incrementally while the content is still being recorded.

The user is then allowed to adjust the start and stop frames for each stream. This may include expanding the clip interval beyond what was originally requested. At this time the operator can also optionally select areas of the video to encode in slow motion by selecting an additional set of start and stop thumbnails in the interface. The operator may also zoom into the content by drawing a rectangle over a thumbnail for the portion of video they would like to zoom into. In an alternate embodiment, the user may choose between pre-defined rectangle sizes optimized for mobile content delivery such as QCIF or QVGA. The entire video can be zoomed, or just a defined time region. The results of these operations can optionally be previewed before committing to create the video files.

Optionally, the operator is able to annotate these video clips with an event from the game. Game status can be imported into the system through an external feed, through analysis of video content (e.g. to pull out game time or recognize a player/action), or by manual entry. The set of imported clips can be associated with relevant metadata (player, action, time in the game, score, etc.) and that metadata can be applied to all or a subset of the clips at once. This metadata is then stored in a database with a relational link to the file(s) that were created.

Finally, the content can optionally be bundled with other related content based on the metadata associated with the clips. For example, content from the same player can be suggested for combination with the current clips. Relational links are established in a database between these content items and they are made available to an end user device as related content.

Figure 3:
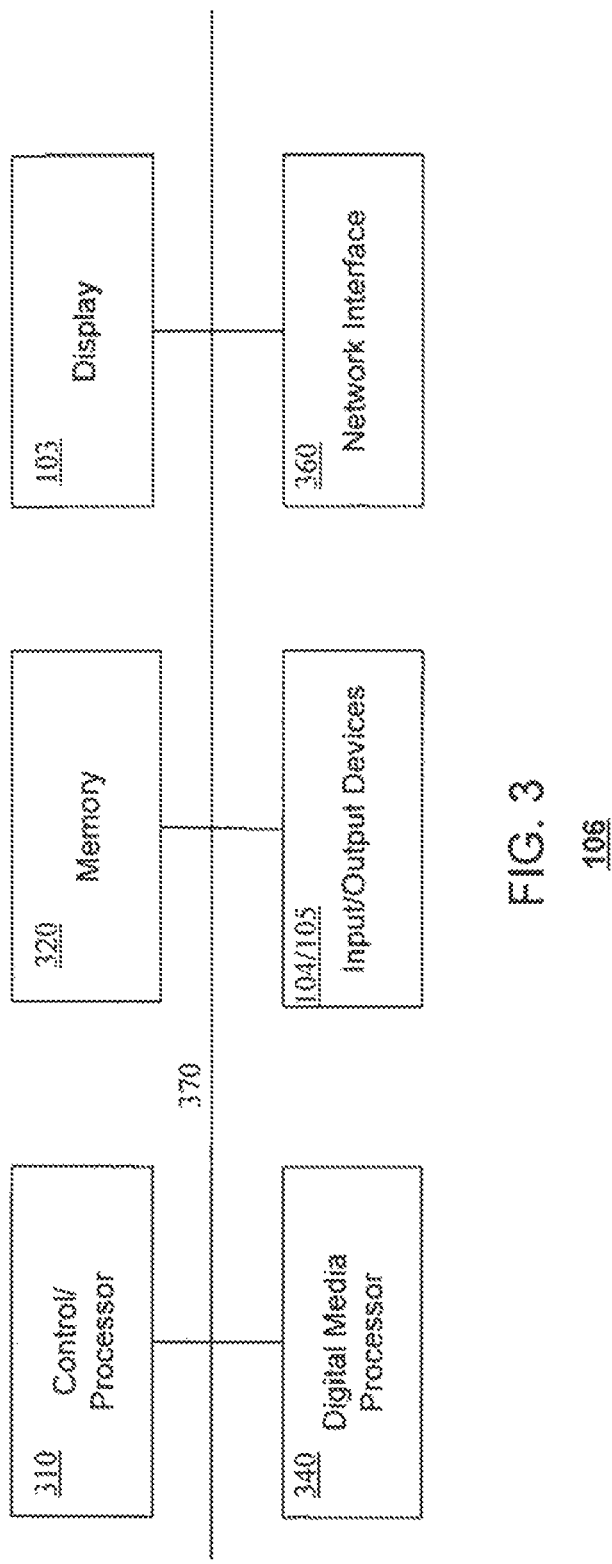
FIG. 3 is a block diagram of the computer of FIG. 1.

FIG. 3 illustrates a possible configuration of a computing system 106 to act as an electronic device to execute the present invention. Computer system 106 may include controller/processor 310, memory 320, display 103, digital media processor 340, input/output device interface 104/105, and network interface 360, connected through bus 370. Computer system 106 may implement any operating system, such as Windows or UNIX, for example. Client and server software may be written in any programming language, such as ABAP, C, C++, Java or Visual Basic, for example.

Controller/processor 310 may be any programmed processor known to one of skill in the art. However, above-described techniques can also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the creation of video clips as described herein can be used to implement the present invention.

Memory 320 may include volatile and nonvolatile data storage, including one or more electrical, magnetic or optical memories such as a random access memory (RAM), cache, hard drive, or other memory device. Memory 320 may have a cache to speed access to specific data. Memory 320 may also be connected to a compact disc-read only memory (CD-ROM), digital video disc—read only memory (DVD-ROM), DVD read write input, tape drive or other removable memory device that allows media content to be directly uploaded into the system.

Digital media processor 340 is a separate processor that may be used by the system to more efficiently present digital media. Such digital media processors may include video cards, audio cards, or other separate processors that enhance the reproduction of digital media.

Input/Output interface 104/105 may be connected to one or more input devices that may include a keyboard, mouse, pen-operated touch screen or monitor, voice-recognition device, or any other device that accepts input. Input/Output interface 104/105 may also be connected to one or more output devices, such as a monitor, printer, disk drive, speakers, or any other device provided to output data.

Network interface 360 may be connected to a communication device, modem, network interface card, a transceiver, or any other device capable of transmitting and receiving signals over network 102. Network interface 360 may be used to transmit the media content to the selected media presentation device. Network interface 360 may also be used to download the media content from a media source, such as a website or other media sources. The components of computer system 106 may be connected via an electrical bus 370, for example, or linked wirelessly.

Client software and databases may be accessed by the controller/processor 310 from memory 320, and may include, for example, components that embody the functionality of the present invention. Video and video clips may be stored memory 320. Computer system 106 may implement any operating system, such as Windows or UNIX, for example. Client and server software may be written in any programming language, such as ABAP, C, C++, Java or Visual Basic, for example.

Although not required, the invention is described, at least in part, in the general context of computer-executable instructions, such as program modules, being executed by system 106, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof) through a communications network.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of electronic devices each processing the content in various possible ways. It does not necessarily need to be one system used by all end users. Accordingly, the appended claims and their legal equivalents should only define the invention, rather than any specific examples given.

In the preferred embodiment, an operator using a large screen can review and clip a large number of feeds, possibly more than can be captured by a single computer. In this case, decoded video is captured and stored on remote devices. Real-time preview video streams are delivered from these remote devices to the operator's system 106. When input devices 104/105 receive an instruction to capture a video clip, commands are sent via the network to the remote devices indicating start/stop, slow motion start/stop and boundaries. The remote devices create the resulting video clips based on these commands.

During operation of system 106, video streams from the multiple video sources enter network interface 360 and enter processor 340. When present, processor 340 serves to decode the video, for example via standard MPEG decoding. Video may also be decoded by the general control processor 310. The decoded video is stored in memory 320 and optionally on disk (not shown). Processor 310 then instructs display 103 to display a thumbnail of each video stream as shown in FIG. 2. When input devices 104/105 receive an instruction to capture a video clip, processor 310 captures an appropriate amount of video from each video source. It should be noted that all video captured from each source are of a same time period, and comprise, for example, standard MPEG video. Thus, all clips captured from the video sources are, for example, from a same 30 second time period.

At this point, processor 310 instructs display to display an array of thumbnails representing each video clip. As discussed above, each row of the array comprises images from a particular video source, while each column of the array comprises images from a particular time. Thus, thumbnails from a first video source are displayed in a first row of the array, while thumbnails from a second video source are displayed in a second row of the array. A user is then allowed to click on a particular thumbnail to identify a starting point and an ending point for each clip (row). Thus, devices 104/105 receive information regarding the starting/ending point for each clip and processor 310 then saves the appropriate clips to memory 320. More particularly, upon selecting the final intervals of recording, the system accesses stored video files and extracts the clip for the desired segment. This may involve stitching together multiple saved files as is known in the art. The videos are transcoded into the desired format(s) and are stored. As discussed above, metadata may be obtained from input devices 104/105 and associated with the group of clips.

Figure 4:
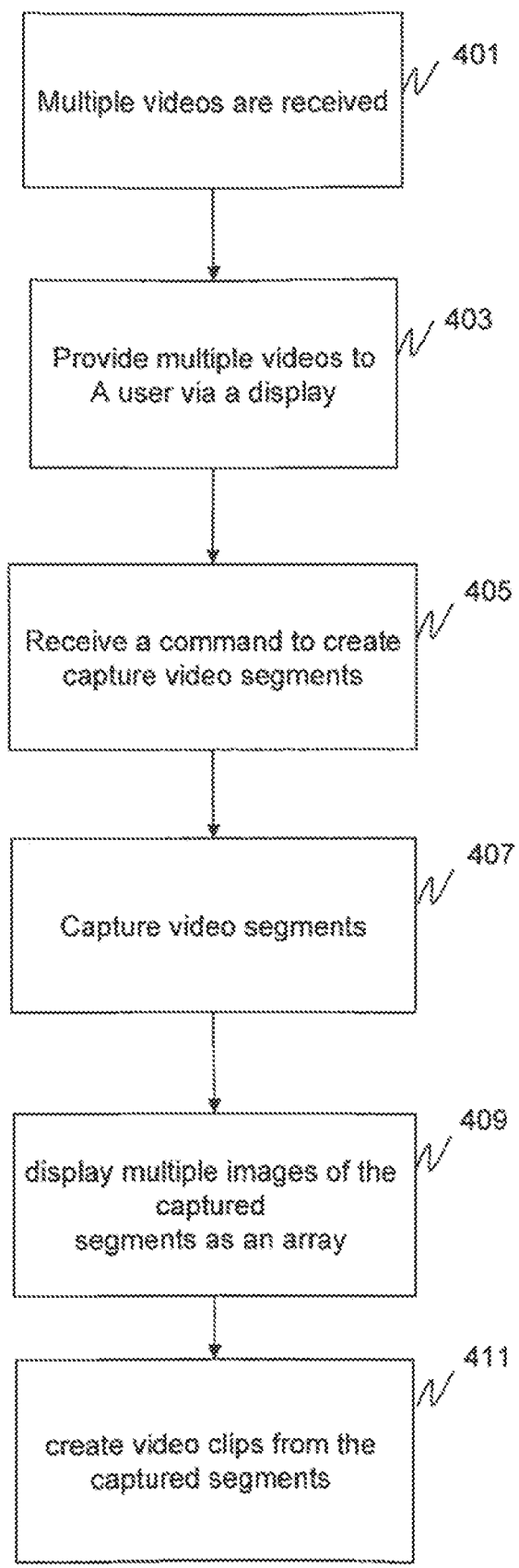
FIG. 4 is a flow chart detailing the capture of multiple video clips.

FIG. 4 is a flow chart detailing the capture of multiple video clips. The logic flow begins at step 401 where multiple videos are received by controller 340. Processor 310 then provides the multiple videos to a user by displaying the multiple videos on display 103 (step 403). As discussed above, the step of providing multiple videos to the user comprises the step of providing the multiple videos as thumbnails. At step 405 processor 310 receives a command from an input device to create video clips of a particular length of time from the multiple videos. Processor 310 then captures segments of the multiple videos for the particular length of time (step 407) and displays multiple images of the captured segments as an array (step 409). As discussed, the array has an x-axis representing time, and a y-axis representing video source, or vice versa. Preferably, the array comprises thumbnail images from the captured segments. Finally, at step 411, processor 310 creates the video clips from the captured segments and stores them in memory 320.

As discussed above, commands received from the user may comprise mouse clicks on various images of the array. Processor 310 can associate the mouse click with a starting or stopping frame for use in creating the video clips, a slow-motion frame, or a region of a frame for creating the video clips. Additionally, processor 310 can retrieve metadata regarding the video clips and store the video clips with the metadata.

While the invention has been particularly shown and described with reference to a particular embodiment, it will be understood by those skilled in the art that various changes in form and details may be made therein without departing from the spirit and scope of the invention. It is intended that such changes come within the scope of the following claims:

What is claimed is:

1. A method comprising:
   displaying, by a client device, one or more video streams;
   displaying, by the client device, a plurality of soft buttons, each of the plurality of soft buttons associated with a different length of time;
   receiving, by the client device, a selection of a soft button from the plurality of soft buttons;
   displaying, by the client device, a presentation area including one or more segments of the one or more video streams, the one or more segments of the length of time associated with the selected soft button and captured from the one or more video streams, wherein the presentation area has an x-axis representing time;
   receiving, by the client device, selection information indicating for each of the one or more segments a starting point and an ending point selected by a user from the presentation area; and
   displaying, by the client device, an indication of the creation of a video clip from the one or more segments based on the selection information.

2. The method of claim 1, wherein each video clip created from one or more segments includes content of the one or more segments between the starting point and the ending point selected by the user from the presentation area.

3. The method of claim 1, wherein each of the one or more video streams is provided by a different video camera.

4. The method of claim 1, wherein the starting point is associated with a starting frame of the one or more segments and the ending point is associated with an ending frame of the one or more segments.

5. The method of claim 1, wherein the selection information further indicates that a slow-motion effect be applied to the video clip created from the one or more segments.

6. The method of claim 1, wherein the one or more video streams capture an event.

7. The method of claim 1, wherein the video clip is stored.

8. A non-transitory computer readable storage medium storing computer-executable instructions that when executed by one or more processors cause the one or more processors to perform operations comprising:
   displaying, by a client device, one or more video streams;
   displaying, by the client device, a plurality of soft buttons, each of the plurality of soft buttons associated with a different length of time;
   receiving, by the client device, a selection of a soft button from the plurality of soft buttons;
   displaying, by the client device, a presentation area including one or more segments of the one or more video streams, the one or more segments of the length of time associated with the selected soft button and captured from the one or more video streams, wherein the presentation area has an x-axis representing time;
   receiving, by the client device, selection information indicating for each of the one or more segments a starting point and an ending point selected by a user from the presentation area; and
   displaying, by the client device, an indication of the creation of a video clip from the one or more segments based on the selection information.

9. The computer readable storage medium of claim 8, wherein each video clip created from one or more segments includes content of the one or more segments between the starting point and the ending point selected by the user from the presentation area.

10. The computer readable storage medium of claim 8, wherein each of the one or more video streams is provided by a different video camera.

11. The computer readable storage medium of claim 8, wherein the starting point is associated with a starting frame of the one or more segments and the ending point is associated with an ending frame of the one or more segments.

12. The computer readable storage medium of claim 8, wherein the selection information further indicates that a slow-motion effect be applied to the video clip created from the one or more segments.

13. The computer readable storage medium of claim 8, wherein the one or more video streams capture an event.

14. The computer readable storage medium of claim 8, wherein the video clip is stored.

15. A computer system comprising:
one or more processors; and
a non-transitory computer readable storage medium storing computer-executable instructions that when executed by the one or more processors cause the one or more processors to perform operations comprising:
displaying one or more video streams;
displaying a plurality of soft buttons, each of the plurality of soft buttons associated with a different length of time;
receiving a selection of a soft button from the plurality of soft buttons;
displaying a presentation area including one or more segments of the one or more video streams, the one or more segments of the length of time associated with the selected soft button and captured from the one or more video streams, wherein the presentation area has an x-axis representing time;
receiving selection information indicating for each of the one or more segments a starting point and an ending point selected by a user from the presentation area; and
displaying an indication of the creation of a video clip from the one or more segments based on the selection information.

16. The computer system of claim 15, wherein each video clip created from one or more segments includes content of the one or more segments between the starting point and the ending point selected by the user from the presentation area.

17. The computer system of claim 15, wherein each of the one or more video streams is provided by a different video camera.

18. The computer system of claim 15, wherein the starting point is associated with a starting frame of the one or more segments and the ending point is associated with an ending frame of the one or more segments.

19. The computer system of claim 15, wherein the selection information further indicates that a slow-motion effect be applied to the video clip created from the one or more segments.

20. The computer system of claim 15, wherein the one or more video streams capture an event.

\* \* \* \* \*